(12) United States Patent
Malaney

(10) Patent No.: US 8,022,870 B2
(45) Date of Patent: Sep. 20, 2011

(54) SELF MONITORING GPS ON MOBILE DEVICE

(75) Inventor: Robert Anderson Malaney, East Lindfield (AU)

(73) Assignee: Nariste Networks Pty Ltd, New South Wales (AU)

( * ) Notice: Subject to any disclaimer, the term of this patent is extended or adjusted under 35 U.S.C. 154(b) by 595 days.

(21) Appl. No.: 11/661,707

(22) PCT Filed: Aug. 31, 2005

(86) PCT No.: PCT/AU2005/001351
§ 371 (c)(1),
(2), (4) Date: Feb. 11, 2008

(87) PCT Pub. No.: WO2006/024112
PCT Pub. Date: Mar. 9, 2006

(65) Prior Publication Data
US 2009/0009387 A1   Jan. 8, 2009

(30) Foreign Application Priority Data
Sep. 2, 2004 (AU) ................................. 2004905024

(51) Int. Cl.
*G01S 19/34* (2010.01)
(52) U.S. Cl. ................................. 342/357.74
(58) Field of Classification Search ............. 342/357.01–357.17, 357.2–357.78; 455/343.1–343.6
See application file for complete search history.

(56) References Cited

U.S. PATENT DOCUMENTS

| 5,592,173 | A  | * | 1/1997  | Lau et al. ................. 342/357.12 |
| 5,864,315 | A  |   | 1/1999  | Welles, II et al. |
| 6,141,570 | A  | * | 10/2000 | O'Neill et al. ................. 455/574 |
| 6,298,229 | B1 |   | 10/2001 | Tomlinson, Jr. et al. |
| 6,584,331 | B2 | * | 6/2003  | Ranta ............................ 455/574 |
| 6,590,525 | B2 |   | 7/2003  | Yule et al. |
| 2002/0091956 | A1 | | 7/2002 | Potter et al. |
| 2003/0083814 | A1 | | 5/2003 | Gronemeyer |
| 2003/0107514 | A1 | | 6/2003 | Syrjarinne et al. |
| 2005/0162306 | A1 | * | 7/2005 | Babitch et al. ........... 342/357.05 |

FOREIGN PATENT DOCUMENTS

| GB | 2 394 134 A | 4/2004 |
| WO | 02/088769   | 11/2002 |

OTHER PUBLICATIONS

Haykin, S. "Neural Networks: A Comprehensive Foundation—$2^{nd}$ Edition", Prentice Hall, Upper Saddle River, New Jersey, pp. 641-645.

Conner, S., et al. "Building a Wireless World with Mesh Networking Technology" in: *Technology @ Intel*, (Nov. 2003), pp. 1-6.

(Continued)

*Primary Examiner* — Thomas Tarcza
*Assistant Examiner* — Nga X Nguyen
(74) *Attorney, Agent, or Firm* — Ladas & Parry LLP

(57) ABSTRACT

A method, a mobile device arid a computer program product for acquiring GPS on a mobile device possessing GPS capability are disclosed. The method comprises the step of setting a current value of the period of the power-up phase of the GPS dependent upon adaptive predictions of when the GPS should be powered on to meet specifications on positioning accuracy and GPS acquisition time.

36 Claims, 6 Drawing Sheets

OTHER PUBLICATIONS

Ahmavaara, K., et al. "Integration of Wireless LAN and 3G Wireless: Interworking Architecture Between 3GPP and WLAN Systems" in: *IEEE Communication Magazine*, (Nov. 2003), pp. 74-81.

Karygiannis, T., et al. "Wireless Network Security: 802.11, Bluetooth and Handheld Devices" in: *National Institiute of Standards and Technology, Technology Administration U.S. Department of Commerce*, (Nov. 2002), pp. ES-1-G-3.

Koshima, H., et al. "Finding a Mentally Impaired Relative, a Lost Child, or a Criminal in a Sprawling Metropolitan Area would be Simple if the Person Were Equipped With a Personal Locator Device: Personal Locator Services Emerge" in: *IEEE Spectrum*, (Feb. 2000), pp. 41-48.

OET Bulletin No. 17 "Guidelines for Testing and Verifying the Accuracy of Wireless E911 Location Systems" Federal Communications Commission USA, (Apr. 2000), pp. 1-12.

Bahl, P., et al. "RADAR: An In-Building RF-based User Location and Tracking System" *Microsoft Research*.

Ladd, A., et al. "Robotics-Based Location Sensing Using Wireless Ethernet" *MOBICOM '02*, (Sep. 2002), Atlanta Georgia, USA.

Patwari, N., et al. "Relative Location Estimation in Wireless Sensor Networks" *IEEE Transactions on Signal Processing*, vol. 15, (2003), pp. 2137-2148.

Capkun, S., et al. "GPS-free Positioning in Mobile Ad-Hoc Networks" *IEEE*, Proceedings of the 34$^{th}$ Hawaii International Conference on Systems Sciences, (2001), pp. 1-10.

Krumm, J., et al., "Probabilistic Inferencing for Location" *2003 Workshop on Location-Aware Computing (Part of UbiComp 2003)*, Seattle, WA, USA, (2003).

"Newbury Networks Debuts First Location-Enabled Networks Solution for 802.11B WLANS", Release Detail Newbury Networks [online], [retrieved on Nov. 2, 2007]. Retrieved from the internet ,<URL: http://www.newburynetworks.com/pr_021102/news_events-news_archive-release_details....>.

Denning, D., et al. "Location-based Authentication: Grounding Cyberspace for Better Security" Computer Fraud & Security [online], [retrieved on Nov. 1, 2007]. Retrieved from the internet, URL: http://www.cs.georgetown.edu/~denning/infosec/Grounding.txt>.

Denning, D., et al. "Using GPS to Enhance Data Security" GPS World—Geo-Encryption (Apr. 2003) [online], [retrieved on Nov. 1, 2007]. Retrieved from the internet, <URL: http://www.gpsworld.com/gpsworld/content/printContentPopup.jsp?id=57975>.

Epstein, K., "How Geo-Encryption Makes Copyright Protection Global" Cioinsight—Global Encryption by Satellite [online], [retrieved on Nov. 1, 2007] Retrieved from the internet, <URL: http://www.coinsight.com/print_article2/0,1217,a=24831,00.asp>.

van Diggelen, F., et al. "Indoor GPS Technology" Presented at CTIA Wireless-Agenda, Dallas (May 2001), pp. 1-10.

Rappaport, T., "Principles and Practice" in: *Wireless Communications*, Prentice Hall Communications Engineering and Emerging Technology Series, pp. 123-133.

Battiti, R., et al. "Statistical Learning Theory for Location Fingerprinting in Wireless LANs" Technical Report DIT-02-0086, Universita di Trento (Oct. 2002), pp. 1-12.

Royer, E., et al. A Review of Current Routing Protocols for Ad Hoc Mobile Wireless Networks in *IEEE Personal Communications* (Apr. 1999), pp. 46-55.

Ziv, J., et al. "Some Lower Bounds on Signal Parameter Estimation" in: *IEEE Transactions on Information Theory*, vol. 15, (May 1969), pp. 386-391.

"SnapTrack's Wireless Assisted GPS (A-GPS) Solution Provides the Industry's Best Location System" SnapTrack, a QUALCOMM Company, White Paper, pp. 1-3.

Caffery, J., et al. "Wireless Location in CDMA Cellular Radio Systems" *Kluwer Academic Publishers*, Boston, pp. 1-11.

Caffery, J., et al. "Overview of Radiolocation in CDMA Cellular Systems" Georgia Institute of an Technology School of Electrical and Computer Engineering, Atlanta, GA, pp. 1-32.

"How A-GPS Works" (2001) SnapTrack, a QUALCOMM Company, White Paper (http://www.snaptrack.com/pdf/How_aGPS_works.pdf).

"TricklePower" in Reference Guideline to TF GPS Engine Board by Laipac Technology, Inc. (2001) (http:///www.laipac.com/datasheets/gps/TF%20GPS%20Series.pdf).

A second Office Action dated May 24, 2010 in respect of Chinese corresponding Application No. 200580036782.3 and an English-language version thereof.

A third Office Action dated Jan. 19, 2011 in respect of Chinese corresponding Application No. 200580036782.3 and an English-language version thereof.

Chinese First Office Action, Nov. 20, 2009—State Intellectual Property Office of P.R.C. and English translation.

European Communication, May 28, 2010—European Patent Office.

\* cited by examiner

SELF MONITORING GPS ON MOBILE DEVICE

FIELD OF THE INVENTION

The present invention relates generally to GPS acquisition and in particular to power conservation for GPS-enabled devices.

BACKGROUND

Techniques for the positioning of mobile devices in a wireless environment are important for a number of applications, such as emergency location services, ad hoc networks, and vehicle tracking.

In the mobile phone industry, competing technologies address the specific issues of Emergency-911 (E-911) position location. Broadly speaking, these technologies fall into two categories: (1) network-based technologies and (2) Global Positioning Systems (GPS) technologies. The network-based technologies use network-based metrics (e.g., time of flight, angle of arrival etc). The GPS technologies use line-of-sight measurements to satellites.

Network-based and GPS technologies each attempt to meet the US Federal Communications Commission (FCC) requirements for E-911 Emergency Location Services. The FCC requirements set specific statistical requirements on the position accuracy on any technology. Currently the FCC's E-911 Phase II Plans dictate that 67% of all attempts for a position location must have an accuracy of less than 50 m, and 95% of calls must have an accuracy of less than 150 m (Federal Communications Commission E-911 http://www-.fcc.gov/911/enhanced/). Although not mandated, it is generally accepted that acquisition time of a position fix must be in a reasonably short time scale. A positioning technology that can deliver a position fix within a timescale of 30 seconds is generally considered reasonable for E-911 services, since such a small amount of time has negligible impact on the total time taken for the emergency services to reach the emergency scene.

GPS-based techniques are known to provide accurate position measurements. However, such techniques are prone to a lengthy GPS acquisition time (the length of time taken from the time a GPS device is powered on until that device obtains a position fix). A principal reason for this is that the device does not know a priori which GPS satellites are currently in view and must undertake an exhaustive search to find the satellites in view. This is termed a "cold start". Generally speaking in cold start mode, a GPS device can take up to several minutes to find a location fix, which is a time-scale deemed inappropriate for many applications, such as E-911.

One simple approach to overcome this difficulty involves simply keeping the GPS device switched on at all times. After an initial fix, the satellite almanac and ephemeris data are continuously kept up-to-date, and a cold start phase can be avoided. In this mode, the GPS device is said to be in "hot start" mode. A principal disadvantage of always keeping the device in a hot-start mode is the drain on the battery resources of the mobile device. Battery power in a mobile device is a precious resource, and any steps that can be taken to maximize battery life are advantageous. Simply keeping a GPS device powered on at all times to avoid the cold start is generally considered an unacceptable solution. This is particularly the case for an application like E-911, where the GPS location finding capability is likely to be only rarely utilized.

A potential resolution to the problem of cold starts can be found in the Assisted-GPS (A-GPS) system proposed by Qualcomm; see Qualcomm White Paper, *How A-GPS Works,* 2001 (http://www.snaptrack.com/pdf/How_aGPS_works.pdf). In this system, the network "assists" the mobile device by transferring updated almanacs and ephemeris, collected by base stations, to the mobile device upon receipt of a location request. This speeds up the GPS acquisition of a mobile device relative to the acquisition from a cold start. The system also integrates network positioning information to find optimal position accuracy. However, this approach at attempting to solve the cold start problem comes at the cost of increased complexity in the network system design and incurs additional costs for the required extra infrastructure (i.e. network hardware and communications). This system is also not workable if the mobile device is disconnected from a network, but still requires a GPS position fix.

Another system attempting to address cold start is the use of periodic power-down of the GPS device. In this mode, the device is periodically switched off for a set period. As long as the time switched off remains small, at each onset of the power-up phase, the GPS device effectively commences in hot start mode. This periodic power-down of a GPS device is termed "TricklePower" by GPS chipset manufacturers; see Laipac Technology Inc., *Reference Guideline to TF GPS,* September 2001, (http://www.laipac.com/datasheets/gps/TF%20GPS%20Series.pdf). In this mode, a user is allowed to set initially the power-up period, $P_u$. For example, setting $P_u=30$ minutes means the GPS device powers up every 30 minutes to acquire a position fix. Once the fix is obtained (usually within seconds), the GPS device enters power-down mode.

Simply guessing what value to set $P_u$ at is not optimal. A need clearly exists for an improved GPS acquisition system.

SUMMARY

According to an aspect of the present invention, there is provided a method of acquiring GPS on a mobile device possessing GPS capability. The method comprises the step of setting a current value of the period of the power-up phase of the GPS dependent upon adaptive predictions of when the GPS should be powered on to meet specifications on positioning accuracy and GPS acquisition time.

According to another aspect of the present invention, there is provided a mobile device. The mobile device comprises a processor and memory coupled to the processor; a GPS module coupled to the processor providing a GPS capability for the mobile device; and means for setting a current value of the period of the power-up phase of the GPS module dependent upon adaptive predictions of when the GPS module should be powered on to meet specifications on positioning accuracy and GPS acquisition time.

According to yet another aspect of the present invention, there is provided a computer program product for a mobile device possessing GPS capability. The computer program product having a computer readable medium storing a computer program for acquiring GPS on the mobile device. The computer program product comprises computer program code means for interfacing with the GPS capability of the mobile device and computer program code means for setting a current value of a period of the power-up phase of the GPS module dependent upon adaptive predictions of when the GPS module should be powered on to meet specifications on positioning accuracy and GPS acquisition time.

According to yet another aspect of the present invention, there is provided a method of acquiring GPS on a mobile device possessing GPS capability. The method comprises the steps of using a position error between a predicted position and an actual position of the mobile device at a last position fix; if the position error is too large, adjusting a current value of the period of the power-up phase downward; if the position error is too small, adjusting the current value of the period of the power-up phase upward; estimating using a neural network a new value of the period of the power-up phase dependent upon the position error and setting a new value of the period of the power-up phase to a weighted value dependent upon an acceptable error bound.

BRIEF DESCRIPTION OF THE DRAWINGS

Embodiments of the invention are described hereinafter by way of example with reference to the drawings, in which.

DETAILED DESCRIPTION

Figure 1:
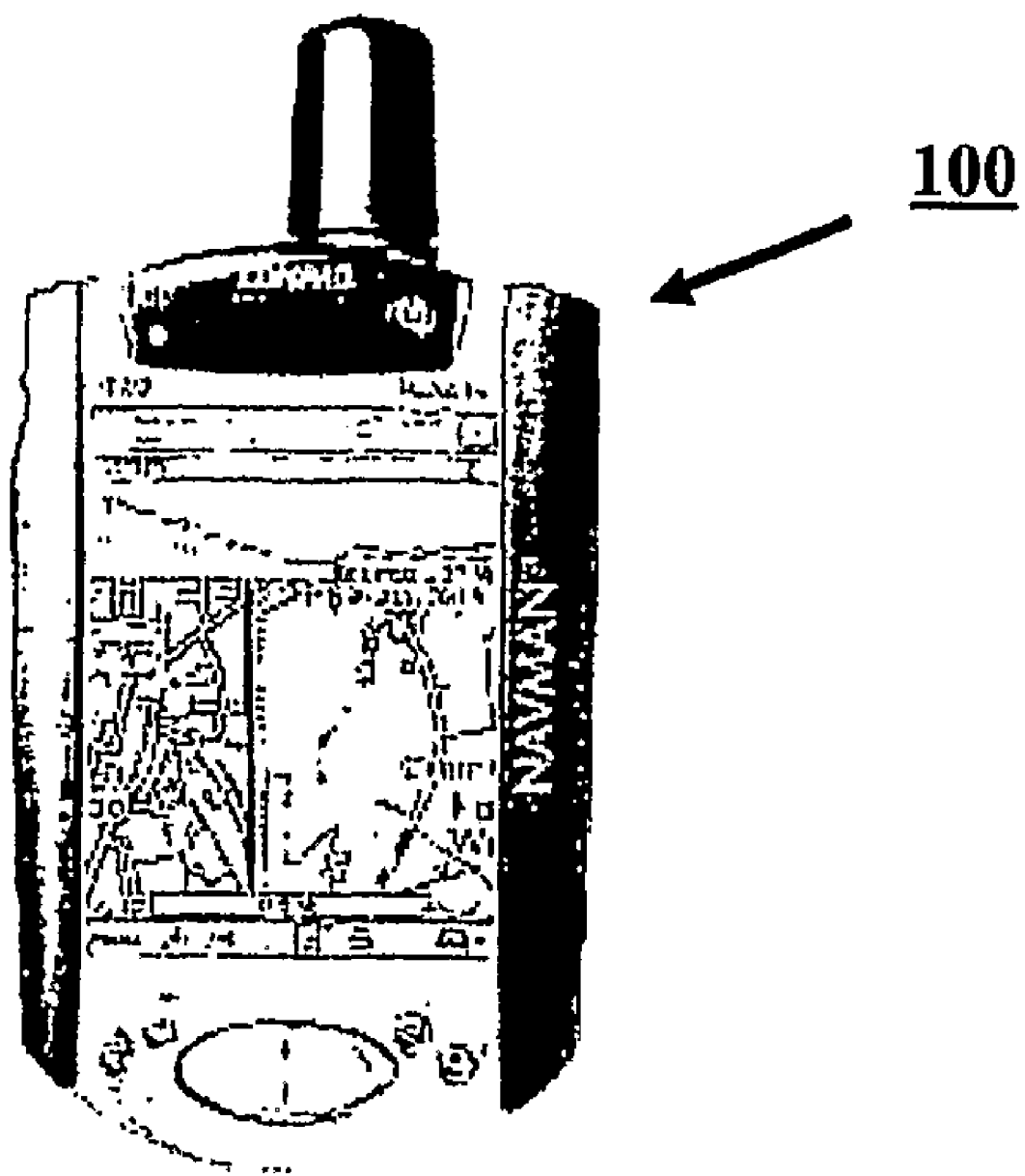
FIG. 1 is an image of a GPS-equipped mobile device with which an embodiment of the invention may be practiced.

Methods, apparatuses, and computer program products for energy efficient GPS acquisition on a mobile device are disclosed. The acquisition meets pre-assigned statistical accuracy and acquisition time. In the following description, numerous specific details, including particular wireless networks, positioning systems, network configurations, filtering techniques, and the like are set forth. However, from this disclosure, it will be apparent to those skilled in the art that modifications and/or substitutions may be made without departing from the scope and spirit of the invention. In other circumstances, specific details may be omitted so as not to obscure the invention.

The methods may be implemented in modules. A module, and in particular its functionality, can be implemented in either hardware or software. In the software sense, a module is a process, program, or portion thereof that usually performs a particular function or related functions. Such software may be implemented in C, C++, JAVA, JAVA BEANS, Fortran, or a combination thereof, for example, but may be implemented in any of a number of other programming languages/systems, or combinations thereof. In the hardware sense, a module is a functional hardware unit designed for use with other components or modules. For example, a module may be implemented using discrete electronic components, or it may form at least a portion of an entire electronic circuit such as a Field Programmable Gate Arrays (FPGA), Application Specific Integrated Circuit (ASIC), and the like. A physical implementation may also comprise configuration data for a FPGA, or a layout for an ASIC, for example. Still further, the description of a physical implementation may be in EDIF netlisting language, structural VHDL, structural Verilog, or the like. Numerous other possibilities exist. Those skilled in the art will appreciate that the system may also be implemented as a combination of hardware and software modules.

Some portions of the following description are presented in terms of algorithms and representations of operations on data within a computer system or other device capable of performing computations. Such algorithmic descriptions and representations may be used by those skilled in the art to convey the substance of their work to others skilled in the art. An algorithm is a self-consistent sequence of steps leading to a desired result. The steps are those requiring physical manipulations of physical quantities. Usually, though not necessarily, these quantities take the form of electrical, magnetic, or electromagnetic signals capable of being stored, transferred, combined, compared, and otherwise manipulated. These signals may be referred to as bits, values, elements, symbols, characters, terms, numbers, or the like.

The above and similar terms are to be associated with the appropriate physical quantities and are merely convenient labels applied, to such quantities. Unless specifically stated otherwise, and as apparent from the following, discussions utilizing terms such as "receiving", "calculating", "predicting", "comparing", "determining", "storing", "adjusting", "using", "estimating", "setting" or the like, refer to the action and processes of a computer system, or a similar electronic device. Such a system or device manipulates and transforms data represented as physical quantities within the registers and memories of the computer system into other data similarly represented as physical quantities within the computer system registers, memories, or another form of storage, transmission or display devices.

Apparatuses and systems for performing the operations of the methods are also described. Such an apparatus may be specifically constructed for the required purpose. Alternatively, the apparatus may comprise a general-purpose computer (e.g., a notebook PC) or another computing device (e.g., a PDA), which may be selectively activated or reconfigured by a computer program read by the computer. The algorithms presented herein are not inherently related to any particular computer or other apparatus; various general-purpose machines may be used with programs.

The embodiments of the invention also relate to a computer program(s) or software, in which method steps may be put into effect by computer code. The computer program is not intended to be limited to any particular programming language, operating environment, and implementation thereof. A variety of programming languages, operating systems, and coding thereof may be used. Moreover, the computer program is not intended to be limited to any particular control flow. There are many other variants of the computer program, which can use different control flows without departing the scope and spirit of the invention. Furthermore, one or more of the steps of the computer program may be performed in parallel rather than sequentially.

The computer program may be stored on any computer readable medium. The computer readable medium may comprise storage devices, such as magnetic media disks, CD-ROMs, DVDs, flash RAM devices, memory chips, memory cards, magnetic tape, other storage devices and media suitable for interfacing with and being read by a general-purpose computer, and combinations thereof. The computer readable medium may also include a hard-wired medium, such as a local area network or the Internet, or wireless medium, such as an IEEE 802.11 wireless network, BlueTooth, a GSM mobile telephone system, PCS, and GPS. The computer program when loaded and executed on such a general-purpose computer effectively results in an apparatus that implements the method steps of the embodiments.

The methods of the embodiments comprise particular control flows. However, different control flows can be practiced without departing from the scope and spirit of the invention.

I. INTRODUCTION

Hereinafter, the next "power-up time" means the time derived by adding the current value of $P_u$ to the time at which a power down occurs. The embodiments of the invention systematically set the period of the power-up phase, $P_u$, whilst retaining the accuracy of the position fix and the acquisition times of the position fix within acceptable bounds.

Adaptive predictions are made of when a GPS device, embedded in a wireless communication device, should be powered on to meet specifications on positioning accuracy and GPS acquisition time. The embodiments of the invention address the issue of setting the period of the power-up phase, $P_u$, whilst retaining the accuracy of the position fix and the acquisition times of the position fix within acceptable bounds. Simply setting $P_u$ to some value at the onset of operation may provide the required bounds for some time epoch, but there is no guarantee that this will also be the case in the future. Also, this simple approach provides no sense of an optimized value of $P_u$. By this, what is meant is the maximum value of $P_u$ allowable whilst still retaining the accuracy of the position fix and the acquisition times of the position fix within acceptable bounds. An example of an inefficient system design would be a GPS system reporting positions every second when an acceptable error bound (accuracy) of 50 meters was required on a device moving at 1 meter per second. The embodiments of the invention allow a GPS device to determine dynamically an optimal $P_u$ in response to such a circumstance.

The methods and apparatuses in accordance with embodiments of the invention address these issues, using adaptive-filter and machine-learning techniques within the mobile device. These techniques allow the mobile device to self monitor the predicted accuracy error and the predicted acquisition times of the GPS device. If these predicted values fail to meet acceptable bounds, the value of $P_u$ is reduced. If the predicted values meet the acceptable bounds, the value of $P_u$ is increased. The embodiments of the invention provide a technology referred to hereinafter as Self Monitored (SM)-GPS. Although applicable to E-911 services, SM-GPS is equally applicable to any mobile GPS device. SM-GPS allows such a device to operate in the most energy efficient way whilst still retaining the position accuracy and acquisition times deemed appropriate by the operator of the GPS device.

The embodiments of the invention assist a mobile device in GPS position acquisition in the most energy efficient way, whilst still retaining the position accuracy and acquisition times deemed appropriate by the operator of the GPS device. In this context, "mobile device" means a power limited (e.g. battery operated) device possessing embedded GPS capability. Examples of such devices are GPS-capable mobile telephones, laptop computers, Personal Digital Assistants (PDAs), and wireless sensor devices, to name a few.

II. DEVICE & SOFTWARE TO SELF-MONITOR POWER OF POWER-UP PHASE

In one embodiment, software is embedded in a mobile device to self-monitor the period of the power-up phase, $P_u$ for the device, and to self-adjust the value of $P_u$ if $P_u$ is inconsistent with maximally conserving the battery power of the mobile device. FIG. 1 shows such a GPS-equipped mobile device 100. The GPS-equipped mobile device may be, for example, a Compaq® iPAQ® PDA with a GPS adaptor connected to the PDA. Software embodying a method to self-monitor the period of the power-up phase is used in the PDA to implement this embodiment.

The embodiments of the invention involve the determination of the error between the predicted position of the mobile device and that of the actual position reported by its GPS. Given a past history of N reported positions, prediction techniques can be used to predict the position of the device at some time t later (the next power-up phase). The value N is determined a priori, usually based on experience of testing of a particular adaptive learning algorithm. In an embodiment of the invention, an adaptive filter technique based on neural networks is used for the position prediction. The difference between this predicted position and the actual position measured at time t can be used to formulate the position error. After forming this position error, the values of the position, the position error, and the value of $P_u$ used at the time of the actual position measurement are stored in the mobile device's memory. In addition, acquisition time $dt_a$ may be stored.

Figure 2:
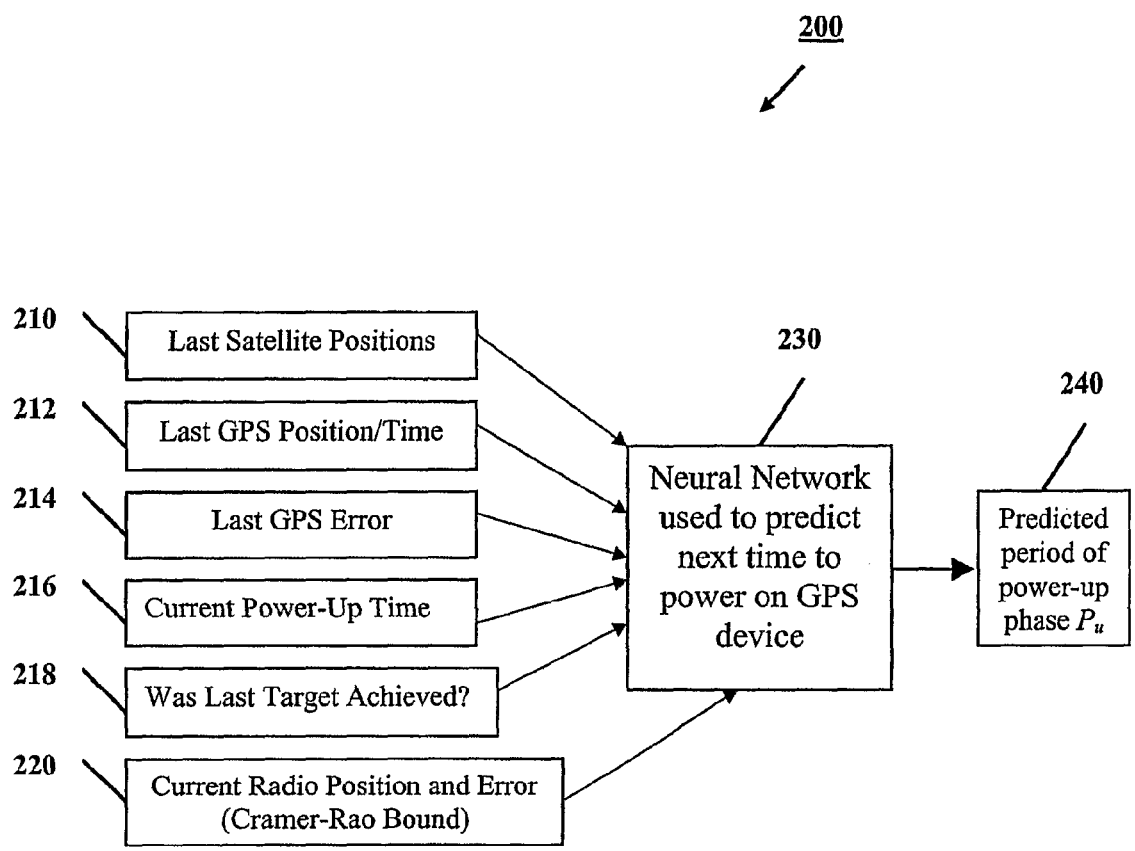
FIG. 2 is a high-level block diagram of a system for adaptively predicting when a GPS-enable wireless communication device should be powered on in accordance with an embodiment of the invention.

FIG. 2 is a block diagram of the system 200 that may be implemented using the PDA of FIG. 1. The system 200 comprises a neural network module 230 that receives various inputs 210-220 to produce a predicted period of the power-up phase $P_u$ 240. The neural network module 230 predicts the next time to power on the GPS device. This module 230 does so dependent upon various inputs including the last satellite positions 210, the last GPS position/time 212, the last GPS error 214, the current power-up time 216, information about whether or not the last target (i.e. were the accuracy requirements satisfied or not) was achieved, and the current radio position and error 220. The latter information 220 may be determined using Cramer-Rao bounds. Further details of the neural network 200 are set forth hereinafter.

Figure 3:
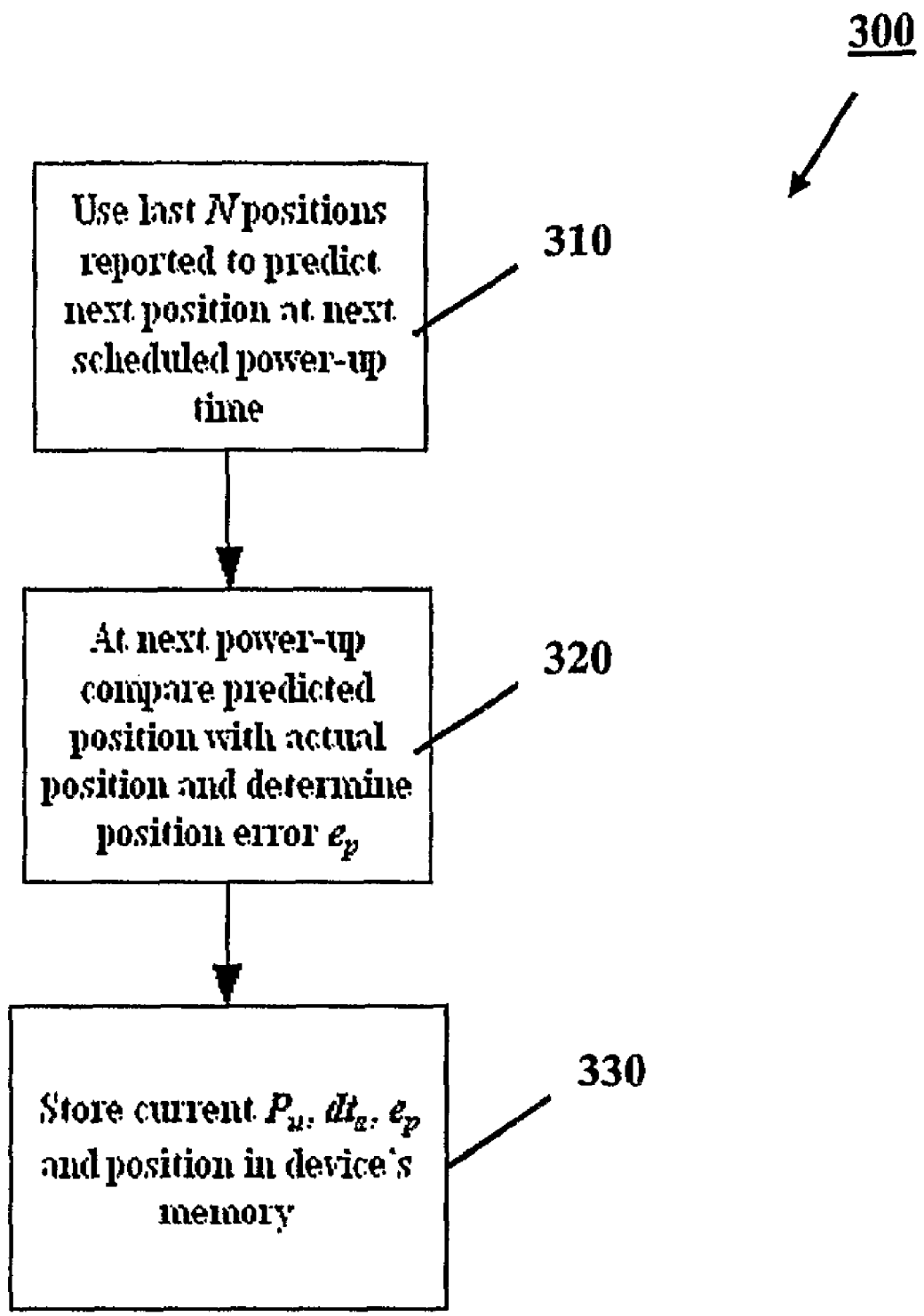
FIG. 3 is a flowchart illustrating a method for determining position errors in accordance with an embodiment of the invention.

A flow chart of a method 300 to determine and store $P_u$, $dt_a$, and $e_p$ is depicted in FIG. 3. Processing commences in step 310 in which the last N positions reported are used to predict the next position at the next scheduled power-up time. That is, given the past position history stored in the mobile device, an adaptive algorithm predicts the next position value. A number of techniques are known for predicting the next position of a mobile device based on its past history of positions, such as regression, Kalman filter, particle filter. In step 320, at the next power-up time, the predicted position of the GPS-enabled mobile device is compared with the actual position of the mobile device, and the position error $e_p$ is determined. Thus, given a predicted value of the position, the predicted value is checked against the actual position location reported the next time the GPS device is powered on to form the prediction error $e_p$. In step 330, the current values of the period of the power-up phase $P_u$, acquisition time $d_{ta}$, and prediction error $e_p$ are stored. This information may be stored in the memory of the wireless device or other suitable storage device. Processing then terminates. The mobile device itself can time how long it took (from the onset of power up) to obtain a GPS fix—this is the acquisition time. If GPS position is unavailable at a particular epoch, nothing is recorded.

The foregoing method uses the stored position error values $e_p$ to determine how best to set the value of $P_u$ given an acceptable error bound $a_c$. A system can thus be designed that adaptively determines the best functional fit to the function $P_u(e_p)$. In one embodiment, a technique based on neural networks 200 can be used for the determination of $P_u(e_p)$. Given the current best estimate of this function and the acceptable error bound $a_c$, the value of $P_u$ can be then set using $P_u(a_c)$. In addition, a weighted contribution of $P_u(a_c)$ can be allowed for to be used in setting the new power-up period. A separate algorithm checks whether the current power-up period is too large or too small, and if so adjusts $P_u$ accordingly. The new power-up period can then be set as $wP_u+(1-w) P_u(a_c)$, where w is a weighting factor in the range 0-1.

Figure 4:
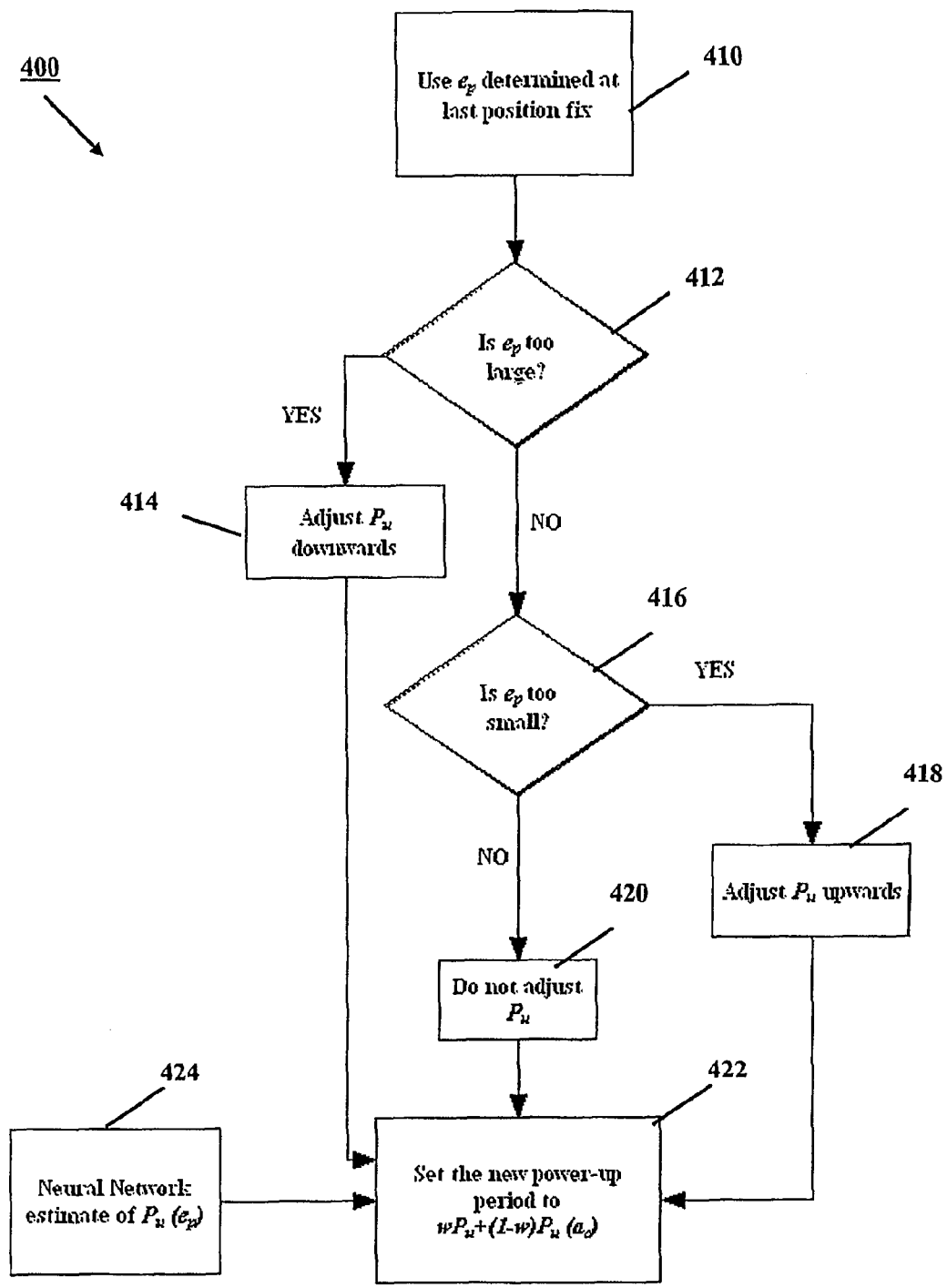
FIG. 4 is a flowchart illustrating a method of determining the value of $P_u$ to satisfy position accuracy bounds in accordance with the embodiment of the invention.

FIG. 4 is a flow diagram of a method 400 for adjusting the value of $P_u$ and setting a new power-up period to deliver SM-GPS to mobile devices. Following on from steps described in FIG. 3, the method 400 commences in step 410. In step 410, the stored position error value $e_p$, determined from the last position fix, is read. In decision step 412, a check is made to determine if the stored position error value $e_p$ is too large. In one embodiment, the term "too large" means that $e_p$ is larger than $a_c$. Variations on this in terms some fraction or multiple of $a_c$ can also be used. If decision step 412 returns true (Yes), processing continues at step 414. In step 414, the current values of the period of the power-up phase $P_u$ is adjusted down. In one embodiment, the new value may be adjusted to $cP_u$, where c is set at 0.5. Again, different values of c or different reduction algorithms may be practiced. The new power-up period has a minimum threshold value below which the power-up period cannot be set. This threshold value may be one second—which is the period set in the default TricklePower mode of many GPS chipsets. However, other threshold values may be specified. Processing continues from step 414 at step 422. Otherwise, if decision step 412 returns false (No), processing continues at step 416.

In decision step 416, a check is made to determine if the stored position error values $e_p$ is too small. In one embodiment, the term "too small" means $e_p$ is smaller than $0.5\ a_c$. However, variations on this in terms of some other fraction of $a_c$ can also be used. If decision step 416 returns true (Yes), processing continues at step 418. In step 418, the current value of the power-up period $P_u$ is adjusted upwards. That is, the value of $P_u$ is increased to a new value. The new value may be calculated as $bP_u$, where b is set at 1.5. Once again, different values of b or different increase algorithms may be practiced. The new power-up period has a maximum threshold value above which it cannot be set. This threshold value may be ten minutes, for example, but this can be set by the user a priori. From step 418, processing continues at step 422. If decision step 416 returns false (No), processing continues at step 420.

In step 420, the current value of the power-up period $P_u$ is not changed, that is, it is maintained at the same value. Processing then continues at step 422. In step 422, the new power-up period is set to $wP_u+(1-w)P_u(a_c)$. In step 424, a neural network estimate of $P_u(e_p)$ is provided to step 422. That is, separate from the above steps, a neural network 200 estimate of the function $P_u(e_p)$ is made based on the stored values of $P_u$ and $e_p$. A weighted average of these two independent values may be used to set the final new power-up period as $wP_u+(1-w)P_u(a_c)$, where $a_c$ is again the acceptable error bound on the position. The value of weighting parameter w is set a priori by the manufacturer or user. In a variant of this process, w can be made time dependent. From step 422, processing terminates.

Figure 5:
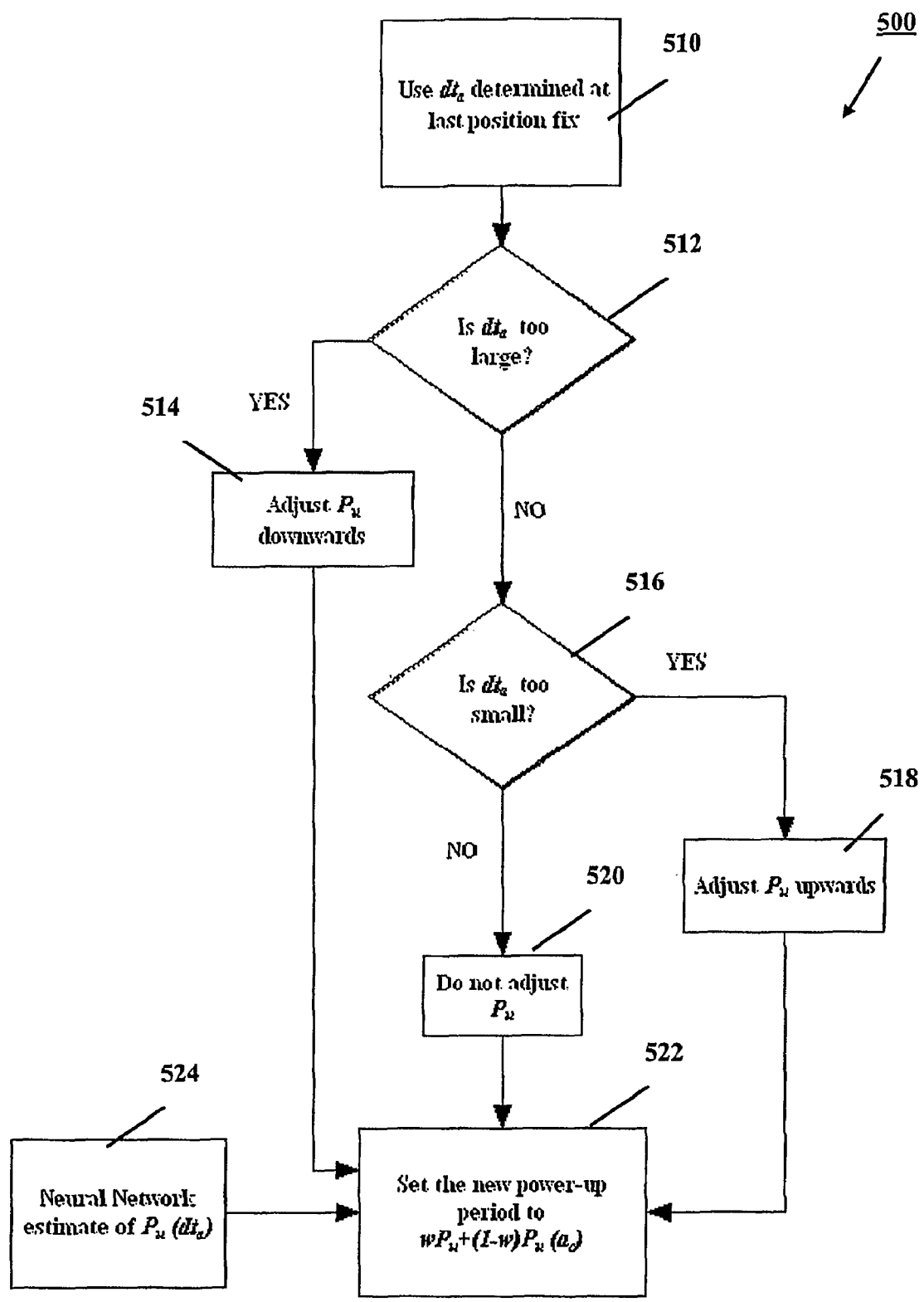
FIG. 5 is a flowchart illustrating a method of determining the value of $P_u$ to satisfy GPS acquisition time bounds.

If position accuracy is the sole criteria dictating the value of $P_u$, the above process would suffice. However, if the acquisition time is the sole criteria dictating the value of $P_u$, the process 500 depicted in the flowchart described in FIG. 5 would suffice. This process 500 is similar to that 400 given above, except that the acquisition time $dt_a$ is used to determine the new power-up period. It is the comparison of $dt_a$ with the pre-assigned value for the bound on acquisition time that is used in decision making process. In step 510, the stored acquisition time $dt_a$ is used to determine the last position fix. In decision step 512, a check is made to determine if the stored acquisition time $dt_a$ is too large. In FIG. 5, ac is now the acceptable error on acquisition time. The term "too large" means that $dt_a$ is larger than $a_c$. Variations on this in terms of some fraction or multiple of $a_c$ can also be used. If decision step 512 returns true (Yes), processing continues at step 514. In step 514, the current values of $P_u$ is adjusted down. Thus, if $dt_a$ is too large, the value of $P_u$ is reduced to a new value. The new value may be set to $cP_u$, where c is set at 0.5. Different values of c or different reduction algorithms may be used. Again, a minimum value of the power-up period is imposed. Processing continues from step 514 at step 522. Otherwise, if decision step 512 returns false (No), processing continues at step 516.

In decision step 516, a check is made to determine if the stored acquisition time $d_a$ is too small. The term "too small" means that $dt_a$ is smaller than 0.5 Variations on this in terms of some other fraction of $a_c$ can also be used. If decision step 516 returns true (Yes); processing continues at step 518. In step 518, the current value of $P_u$ is adjusted upwards. Thus, if $dt_a$ is too small, the value of $P_u$ is increased to a new value. The new value of the power-up period may be set to $bP_u$ where b is set at 1.5. Different values of b or different increase algorithms may be used. Again a maximum value of the power-up period is imposed. From step 518, processing continues at step 522. If decision step 516 returns false (No), processing continues at step 520.

In step 520, the current value of the power-up period $P_u$ is not changed, that is, it is maintained at the same value. Processing then continues at step 522. In step 522, the new power-up period is set to $wP_u+(1-w)P_u(a_c)$. In step 524, a neural network estimate of $P_u(dt_a)$ is provided to step 522. A weighted average of these two independent values is then used to set the final new power-up period as $wP_u+(1-w)P_u(a_c)$, where $a_c$ is again the acceptable error bound on the acquisition time. The value of w is set a priori by the manufacturer or user. In a variant of this process w can be made time dependent. That is, separate from the above steps, a neural network 200 estimate of the function $P_u(dt_a)$ is made based on the stored values of P and $dt_a$. From step 522, processing terminates.

In the event that both the position accuracy and the acquisition time are to be considered in dictating the new value of the power-up period, both algorithms shown in FIGS. 4 and 5 may be run simultaneously and independently. The smaller of the two new values of the power-up period reported by the algorithms may be utilized as the final new value.

As used by an E-911 application, the mobile device can automatically power-up the GPS device and determine its current position, if the GPS is available at that particular time. Due the SM-GPS algorithm described hereinbefore, cold start of the GPS device should be avoided. If for some reason the GPS is unavailable (e.g. by non-line of sight effects) when an emergency position request is made, the mobile device can report the GPS position predicted at the last power-up phase. This has the advantage over A-GPS that no added network infrastructure is required, and an estimate of the mobile device's current position is given even if the GPS suddenly became unavailable.

In the context of continuous position requests, such as in a tracking application, the SM-GPS algorithm adaptively alters the power-up period to find the largest value of $P_u$ at that particular epoch that is consistent with the required accuracy and acquisition time bounds. This has an advantage relative to current systems that the user of the device does not have to estimate and manually enter such a value a priori. This also has the advantage of self-adjusting the value of $P_u$ to changing conditions.

III. NEURAL NETWORKS

The adaptive prediction algorithm used for predicting positions and within the SM-GPS is similar to a Time Delay Neural Network (TDNN). Such networks are neural networks that have a special topology used for position-independent recognition of features within a larger pattern. These types of networks have been successfully used in applications such as speech prediction algorithms and stock predictions. Flexibility in the architectural design of these networks allows them to handle any complex nonlinear behavior as well as more simple linear behavior. A TDNN with just one neuron and a linear transfer function can be trained to operate as an effective linear adaptive filter.

The details of TDNNs, how they operate and the different architectures possible (e.g. learning strategies, transfer functions, number of layers, weights) have been well documented in the literature. For example, see Simon Haykin, *Neural Networks: A comprehensive foundation*, MacMillan, New York, 1994. In one embodiment, the previous positions are used to form the input vectors of the neural network and the output is the predicted position.

Other neural network are constructed to optimally find the functions $P_u(e_p)$ and $P_u(dt_a)$ in FIGS. 4 and 5, respectively. These are referred to as "function discovery" neural networks. Again these networks are adaptive, in the sense that the functional forms $P_u(e_p)$ and $P_u(dt_a)$ do not remain constant in time.

To accommodate various forms of relationships between the input vectors and the output in a neural network, Multi-Layer Perceptron (MLP) models are used. These types of models can be applied to both the TDNN networks and the function discovery neural networks. MLP models typically have an input vector of length r and a hidden layer of s neurons. A matrix of weights $\alpha_{s,r}$ describes the relationship between the input vectors and the layer of neurons. Various transfer function can be deployed such as a log-sigmiod transfer function. In general, the number of hidden layers can be increased to accommodate even more complex systems. In one embodiment, an MLP network that is adopted involves one hidden layer and a number of neurons equal to the size of the input vector. A log-sigmoid transfer function is adopted. For TDNN, the weights associated with the neural network adapt to the newly predicted position and its subsequent measurement of the actual position to minimize future prediction errors. By this mechanism, the network adapts and "learns" the optimal weight $\alpha_{s,r}$ settings relevant to that particular epoch.

For the function discovery neural networks, the weights associated with the neural networks adapt to the newly predicted functional form of the functions ($P_u(e_p)$ and $P_u(dt_a)$ of FIGS. 4 and 5, respectively, based on the incoming new data. This means that the neural networks are constantly re-training themselves.

IV. OTHER EMBODIMENTS & VARIATIONS

The adaptive learning algorithms can be embedded on a signal processing chip in a mobile device. For additional power savings, the neural network calculations may be passed to some external processing unit within the network, if the mobile device is in communication with a larger network, e.g. a wireless network. The value of the power-up period calculated by the external device may then be passed back to the mobile device.

In the event of a GPS signal being unavailable, the position error and acquisition time are not defined for that time. As this could be an indication that the user is in an area where reception of the GPS satellite signals is poor, one may wish not to decrease the power-up period, or at least to limit the decrease. In this way additional energy sources are not used in a vain attempt at acquiring a GPS signal.

There are many neural network architectures that could be deployed in the algorithms of FIGS. 2, 4 and 5. For example, the predicted position can also be a function of the actual $P_u$ being used (in general shorter values of $P_u$ have smaller errors). A neural network can be invoked in which the past history of $P_u$ is also an input to the neural network. Radial basis function networks could also be deployed in the estimates of the functions $P_u(e_p)$ and $P_u(dt_a)$. A thorough discussion of neural network architectures can be found in standard texts. Again, see for example Simon Haykin, *Neural Networks: A comprehensive foundation*, MacMillan, New York, 1994.

VI. OTHER EMBODIMENTS & VARIATIONS

Figure 6:
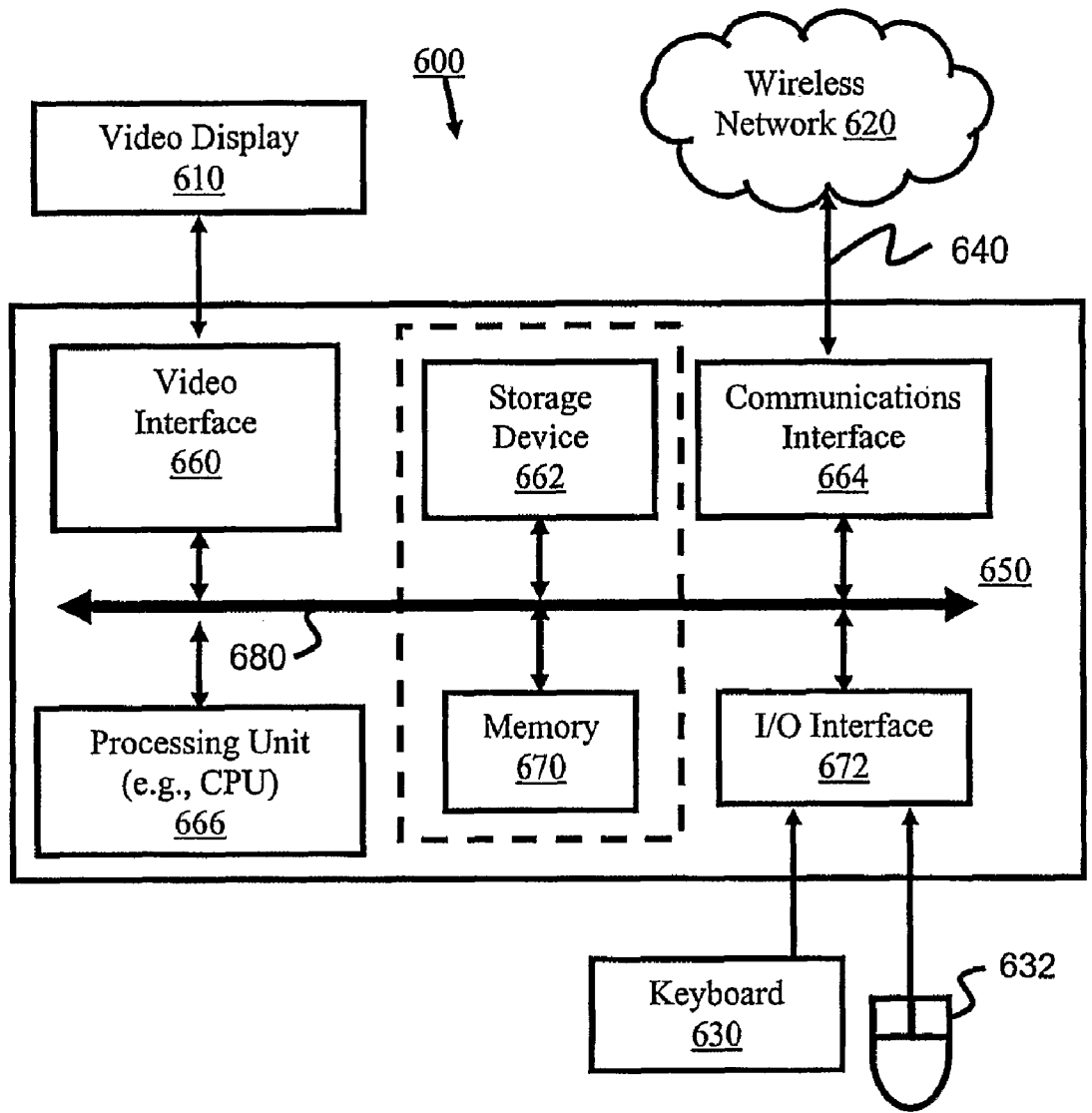
FIG. 6 is a block diagram of a general-purpose computer system with which embodiments of the invention may be practiced.

The methods according to the embodiments of the invention may be practiced using one or more general-purpose computer systems, handheld devices, cellular phone, and other suitable mobile computing devices, in which the processes described with reference to FIGS. 1-5 may be implemented as software, such as an application program executing within the computer system or a handheld device. In particular, instructions in the software that are carried out by the computer effect the steps in the method, at least in part. Software may include one or more computer programs, including application programs, an operating system, procedures, rules, data structures, and data. The instructions may be formed as one or more code modules, each for performing one or more particular tasks. The software may be stored in a computer readable medium, comprising one or more of the storage devices described below, for example. The computer system loads the software from the computer readable medium and then executes the software. FIG. 6 depicts an example of a computer system 600 with which the embodiments of the invention may be practiced. A computer readable medium having such software recorded on the medium is a computer program product. The use of the computer program product in the computer system may effect an advantageous apparatus in accordance with the embodiments of the invention.

FIG. 6 illustrates the computer system 600 in block diagram form, coupled to a wireless network 620. An operator may use the keyboard 630 and/or a pointing device such as the mouse 632 (or touchpad, for example) to provide input to the computer 650. The computer system 600 may have any of a number of output devices, including line printers, laser printers, plotters, and other reproduction devices connected to the computer. The computer system 600 can be connected to one or more other computers via a communication interface 664 using an appropriate communication channel 640. The computer network 620 may comprise a wireless local area network (WLAN), or a 3G network, for example. While not depicted in FIG. 6 to simplify the drawing, it will be readily appreciated by those skilled in the art that the computer system 600 may be equipped with a GPS module, for example, in the manner shown in FIG. 1.

The computer 650 may comprise a processing unit 666 (e.g., one or more central processing units) 666, memory 670 which may comprise random access memory (RAM), read-only memory (ROM), or a combination of the two, input/output (IO) interfaces 672, a graphics interface 660, and one or more storage devices 662. The storage device(s) 662 may comprise one or more of the following: a floppy disc, a hard disc drive, a magneto-optical disc drive, CD-ROM, DVD, a data card or memory stick, flash RAM device, magnetic tape or any other of a number of non-volatile storage devices well known to those skilled in the art. While the storage device is shown directly connected to the bus in FIG. 6, such a storage device may be connected through any suitable interface, such as a parallel port, serial port, USB interface, a Firewire interface, a wireless interface, a PCMCIA slot, or the like. For the purposes of this description, a storage unit may comprise one or more of the memory 670 and the storage devices 662 (as indicated by a dashed box surrounding these elements in FIG. 6).

Each of the components of the computer 650 is typically connected to one or more of the other devices via one or more buses 680, depicted generally in FIG. 6, that in turn comprise data, address, and control buses. While a single bus 680 is depicted in FIG. 6, it will be well understood by those skilled in the art that a computer or other electronic computing device, such as a PDA, may have several buses including one or more of a processor bus, a memory bus, a graphics card bus, and a peripheral bus. Suitable bridges may be utilized to interface communications between such buses. While a system using a CPU has been described, it will be appreciated by those skilled in the art that other processing units capable of processing data and carrying out operations may be used instead without departing from the scope and spirit of the invention.

The computer system 600 is simply provided for illustrative purposes, and other configurations can be employed without departing from the scope and spirit of the invention. Computers with which the embodiment can be practiced comprise IBM-PC/ATs or compatibles, laptop/notebook computers, one of the Macintosh™ family of PCs, Sun Sparcstation™, a PDA, a workstation or the like. The foregoing are merely examples of the types of devices with which the embodiments of the invention may be practiced. Typically, the processes of the embodiments, described hereinafter, are resident as software or a program recorded on a hard disk drive as the computer readable medium, and read and controlled using the processor. Intermediate storage of the program and intermediate data and any data fetched from the network may be accomplished using the semiconductor memory.

In some instances, the program may be supplied encoded on a CD-ROM or a floppy disk, or alternatively could be read from a network via a modem device connected to the computer, for example. Still further, the software can also be loaded into the computer system from other computer readable medium comprising magnetic tape, a ROM or integrated circuit, a magneto-optical disk, a radio or infra-red transmission channel between the computer and another device, a computer readable card such as a PCMCIA card, and the Internet and Intranets comprising email transmissions and information recorded on websites and the like. The foregoing is merely an example of relevant computer readable mediums. Other computer readable mediums may be practiced without departing from the scope and spirit of the invention.

A small number of embodiments of the invention regarding methods, systems, and computer program products for energy efficient GPS acquisition on a mobile device have been described. In the light of the foregoing, it will be apparent to those skilled in the art in the light of this disclosure that various modifications and/or substitutions may be made without departing from the scope and spirit of the invention.

The invention claimed is:

1. A method of acquiring GPS on a mobile wireless communication device for a wireless communications network, said mobile device possessing wireless communications capability for said wireless network and an embedded GPS module for GPS capability, said method comprising:
setting a current value of a period of a power-up phase of said GPS dependent on a current radio position and error of said mobile device in the wireless network determined from the wireless network and adaptive predictions of when said GPS should be powered on to meet specifications on positioning accuracy and GPS acquisition time.

2. The method according to claim 1, wherein the current radio position and error are determined using Cramer-Rao Bounds.

3. The method according to claim 1, wherein the period of the power-up phase is set while retaining the accuracy of a position fix and acquisition times of the position fix within acceptable statistical bounds.

4. The method according to claim 1, wherein said mobile device determines dynamically an optimal period of the power-up phase.

5. The method according to claim 1, wherein said current value of said period of the power-up phase is set using adaptive-filter and machine-learning techniques.

6. The method according to claim 5, wherein said adaptive-filter and machine learning techniques are implemented using said mobile device.

7. The method according to claim further comprising:
if at least one of said position error and acquisition times of GPS fail to meet acceptable bounds, reducing said value of said period of the power-up phase; and
if at least one of said position error and acquisition times of GPS meet said acceptable bounds, increasing said value of said period of the power-up phase.

8. The method according to claim 1, wherein said mobile device comprises a power limited device.

9. The method according to claim 1, wherein said embedded GPS module comprises an embedded GPS device.

10. The method according to claim 1, further comprising the step of making adaptive predictions using a neural network.

11. The method according to claim 1, wherein said setting step comprises:
predicting a next position at a next scheduled power-up time using a number of last positions reported of said mobile device in the wireless network determined from the wireless network;
comparing said predicted position at said next power-up time with an actual position of said mobile device in the wireless network determined from the wireless network and determining said position error; and
storing current values of said period of the power-up phase, acquisition time, said position error, and position in a storage unit of said mobile device.

12. A mobile wireless communication device for a wireless communications network, said mobile device possessing wireless communications capability for said wireless network, comprising:
a processor;
a memory coupled to said processor;

an embedded GPS module coupled to said processor providing a GPS capability for said mobile device; and means for setting a current value of a period of a power-up phase of said GPS dependent on the current radio position and error of said mobile device in the wireless network determined from the wireless network and adaptive predictions of when said GPS should be powered on to meet specifications on positioning accuracy and GPS acquisition time.

13. The mobile device according to claim 12, wherein the current radio position and error are determined using Cramer-Rao Bounds.

14. The mobile device according to claim 12, wherein the period of the power-up phase is set while retaining the accuracy of a position fix and acquisition times of the position fix within acceptable statistical bounds.

15. The mobile device according to claim 12, wherein said mobile device determines dynamically an optimal period of the power-up phase.

16. The mobile device according to claim 12, wherein said current value of said period of the power-up phase is set using adaptive-filter and machine-learning techniques.

17. The mobile device according to claim 16, wherein said adaptive-filter and machine-learning techniques are implemented using said mobile device.

18. The mobile device according to claim 12, further comprising:
means for, if at least one of position error and acquisition times of GPS fail to meet acceptable bounds, reducing said value of said period of the power-up phase; and
means for, if at least one of said position error and acquisition times of GPS meet said acceptable bounds, increasing said value of said period of the power-up phase.

19. The mobile device according to claim 12, wherein said mobile device comprises a power limited device.

20. The mobile device according to claim 19, further comprising a battery for powering said mobile device.

21. The mobile device according to claim 12, further comprising a neural network module for making adaptive predictions.

22. The mobile device according to claim 12, wherein said setting means comprises:
means for predicting a next position at a next scheduled power-up time using a number of last positions reported of said mobile device in the wireless network determined from the wireless network;
means for comparing said predicted position at said next power-up time with an actual position of said mobile device in the wireless network determined from the wireless network and determining said position error; and
means for storing current values of a period of the power-up phase, acquisition time, said position error, and position in a storage unit of said mobile device.

23. A computer program product for a mobile wireless communication device for a wireless communication network, said mobile device possessing wireless communications capability for said wireless network and an embedded GPS module for GPS capability, said computer program product having a computer readable medium storing a computer program for acquiring GPS on said mobile device, comprising:
computer program code means for interfacing with the GPS capability of said mobile device; and
computer program code means for setting a current value of the period of the power-up phase of said GPS dependent on a current radio position and error of said mobile device in the wireless network determined from the wireless network and adaptive predictions of when said GPS should be powered on to meet specifications on positioning accuracy and GPS acquisition time.

24. The computer program product according to claim 23, wherein the current radio position and error are determined using Cramer-Rao Bounds.

25. The computer program product according to claim 23, wherein the period of the power-up phase is set while retaining the accuracy of a position fix and acquisition times of the position fix within acceptable statistical bounds.

26. The computer program product according to claim 23, wherein said computer program product determines dynamically an optimal period of the power-up phase.

27. The computer program product according to claim 23, wherein said current value of said period of the power-up phase is set using adaptive-filter and machine-learning techniques.

28. The computer program product according to claim 27, wherein said adaptive-filter and machine-learning techniques are implemented using said mobile device.

29. The computer program product according to claim 23, further comprising:
computer program code means for, if at least one of said position error and acquisition times of GPS fail to meet acceptable bounds, reducing said value of said period of the power-up phase; and
computer program code means for, if at least one of said position error and acquisition times of GPS meet said acceptable bounds, increasing said value of said period of the power-up phase.

30. The computer program product according to claim 23, wherein said mobile device comprises a power limited device.

31. The computer program product according to claim 30, wherein said mobile device comprises a battery for powering said mobile device.

32. The computer program product according to claim 23, further comprising computer program code means for providing a neural network module to make adaptive predictions.

33. The computer program product according to claim 23, wherein said computer program code means for setting comprises:
computer program code means for predicting at a next position a next scheduled power-up time using a number of last positions reported of said mobile device in the wireless network determined from the wireless network;
computer program code means for comparing said predicted position at said next power-up time with an actual position of said mobile device in the wireless network determined from the wireless network and determining said position error; and
computer program code means for storing current values of a period of the power-up phase, acquisition time, said position error, and position in a storage unit of said mobile device.

34. A method of acquiring GPS on a mobile device for a wireless network, said mobile device possessing wireless communications capability for said wireless network and GPS capability, said method comprising the steps of:
using a position error of said mobile device in the wireless network determined from the wireless network;
if the position error is too large, adjusting a current value of a period of a power-up phase of said GPS downward;

if the position error is too small, adjusting the current value of said period of the power-up phase of said GPS upward;

estimating using a neural network a new value of said period of the power-up phase of said GPS dependent upon said position error; and setting a new value of said period of the power-up phase of said GPS to a weighted value dependent upon an acceptable error bound.

35. A method of acquiring GPS on a mobile device for a wireless network, said mobile device possessing wireless communications capability for said wireless network and GPS capability, said method comprising the steps of:

using an acquisition time at a last position fix of the mobile device in the wireless network determined from the wireless network;

if the acquisition time is too large, adjusting a current value of a period of a power-up phase of said GPS downward;

if the acquisition time is too small, adjusting the current value of said period of the power-up phase of said GPS upward;

estimating using a neural network a new value of said period of the power-up phase of said GPS dependent upon said acquisition time; and setting a new value of said period of the power-up phase of said GPS to a weighted value dependent upon an acceptable bound.

36. The method according to claim 34, wherein the position error is the Cramer-Rao Bound on the radio position of the mobile device.

* * * * *

UNITED STATES PATENT AND TRADEMARK OFFICE
CERTIFICATE OF CORRECTION

| | | |
|---|---|---|
| PATENT NO. | : 8,022,870 B2 | Page 1 of 1 |
| APPLICATION NO. | : 11/661707 | |
| DATED | : September 20, 2011 | |
| INVENTOR(S) | : Robert Anderson Malaney | |

It is certified that error appears in the above-identified patent and that said Letters Patent is hereby corrected as shown below:

Column 12, line 35, after "claim" insert -- 1 --

Signed and Sealed this
Third Day of January, 2012

David J. Kappos
*Director of the United States Patent and Trademark Office*